United States Patent
Nakashima

(10) Patent No.: US 10,059,835 B2
(45) Date of Patent: Aug. 28, 2018

(54) CROSS-LINKABLE NITRILE RUBBER COMPOSITION AND CROSS-LINKED RUBBER

(71) Applicant: ZEON CORPORATION, Tokyo (JP)

(72) Inventor: Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/505,718

(22) PCT Filed: Aug. 26, 2015

(86) PCT No.: PCT/JP2015/073971
§ 371 (c)(1),
(2) Date: Feb. 22, 2017

(87) PCT Pub. No.: WO2016/031848
PCT Pub. Date: Mar. 3, 2016

(65) Prior Publication Data
US 2017/0253729 A1 Sep. 7, 2017

(30) Foreign Application Priority Data
Aug. 29, 2014 (JP) ................................. 2014-175636

(51) Int. Cl.
C08L 1/00 (2006.01)
C08L 9/02 (2006.01)
C08J 3/22 (2006.01)
C08F 236/12 (2006.01)

(52) U.S. Cl.
CPC .............. *C08L 9/02* (2013.01); *C08F 236/12* (2013.01); *C08J 3/22* (2013.01); *C08F 2800/20* (2013.01); *C08F 2810/20* (2013.01); *C08J 2309/02* (2013.01); *C08J 2401/02* (2013.01); *C08L 2205/16* (2013.01); *C08L 2310/00* (2013.01); *C08L 2312/00* (2013.01)

(58) Field of Classification Search
CPC .... C08L 9/02; C08L 2312/00; C08L 2310/00; C08L 2205/16; C08J 3/22; C08J 2309/02; C08J 2401/02; C08F 236/12; C08F 2800/20; C08F 2810/20
USPC ........................................................ 524/35
See application file for complete search history.

(56) References Cited

U.S. PATENT DOCUMENTS

| | | | | |
|---|---|---|---|---|
| 5,043,394 A | * | 8/1991 | Arsenault | C08C 19/20 525/329.3 |
| 2007/0197688 A1 | | 8/2007 | Tsukada et al. | |
| 2010/0076118 A1 | * | 3/2010 | Yano | B60C 1/00 523/351 |
| 2014/0163170 A1 | * | 6/2014 | Nakashima | C08K 5/098 525/132 |
| 2015/0099841 A1 | | 4/2015 | Tsukada et al. | |
| 2015/0322254 A1 | | 11/2015 | Tsukada | |

FOREIGN PATENT DOCUMENTS

| | | |
|---|---|---|
| EP | 1 188 790 A1 | 3/2002 |
| EP | 2463335 A1 | 6/2012 |
| JP | H04-277538 A | 10/1992 |
| JP | 2009-084564 A | 4/2009 |
| JP | 2011-012132 A | 1/2011 |
| JP | 2011-063651 A | 3/2011 |
| WO | 2005/092971 A1 | 10/2005 |
| WO | 2011/016479 A1 | 2/2011 |
| WO | 2013/133358 A1 | 9/2013 |
| WO | 2014/098168 A1 | 6/2014 |

OTHER PUBLICATIONS

Feb. 28, 2017 International Preliminary Report on Patentability issued in International Patent Application No. PCT/JP2015/073971.
Nov. 10, 2015 International Search Report issued in International Patent Application No. PCT/JP2015/073971.
Apr. 6, 2018 Search Report issued in European Application No. 15835138.7.
Pimsaruta Sanprasert et at, "Cotton Fibers Reinforcement of HNBR: Control of Fiber Alignment and its Influence on Properties of HNBR Vulcanizates," Journal of Applied Polymer Science, vol. 131, No. 22, 2014, 9 pages.

* cited by examiner

*Primary Examiner* — Hui Chin
(74) *Attorney, Agent, or Firm* — Oliff PLC

(57) ABSTRACT

A cross-linkable nitrile rubber composition including a highly saturated nitrile rubber (A) containing $\alpha,\beta$-ethylenically unsaturated nitrile monomer units in a ratio of 5 to 50 wt % and having an iodine value of 120 or less, a polysaccharide polymer staple fiber (B) having an average fiber diameter of 1 µm or less, and a cross-linking agent (C), wherein a ratio of content of the polysaccharide polymer staple fiber (B) is 0.5 to 30 parts by weight with respect to 100 parts by weight of the highly saturated nitrile rubber (A).

8 Claims, No Drawings

CROSS-LINKABLE NITRILE RUBBER COMPOSITION AND CROSS-LINKED RUBBER

TECHNICAL FIELD

The present invention relates to a cross-linkable nitrile rubber composition able to give a cross-linked rubber excellent in both tensile strength at ordinary temperature and tensile strength at a high temperature and to a cross-linked rubber obtained using that cross-linkable nitrile rubber composition.

BACKGROUND ART

Since the past, nitrile rubber (acrylonitrile-butadiene copolymer rubber) has been used as a material for rubber parts such as hoses, belts, and tubes for automobiles by taking advantage of its oil resistance, mechanical properties, chemical stability, etc. Further, highly saturated nitrile rubber obtained by saturation by hydrogenating the carbon-carbon double bonds in the polymer main chain of the nitrile rubber is further excellent in heat resistance, so is being used for rubber parts such as seals, belts, hoses, and gaskets.

On the other hand, while art relating mainly to styrene-butadiene rubber, Patent Document 1 discloses the method of drying an aqueous dispersion containing a latex of styrene-butadiene rubber and a staple fiber having an average diameter of less than 0.5 µm to produce a rubber/staple fiber master batch. In this Patent Document 1, the above method of production is used to improve the abrasion resistance, fatigue resistance, etc. However, the cross-linked rubber obtained by the art of Patent Document 1 is not sufficient in heat resistance, in particular, tensile strength at a high temperature, and therefore is not suitable for use for applications where use at a high temperature is envisioned such as the above-mentioned seals, belts, hoses, and gaskets.

RELATED ART

Patent Documents

Patent Document 1: Japanese Patent Publication No. 2011-63651A

SUMMARY OF THE INVENTION

Problem to be Solved by the Invention

The present invention has as its object the provision of a cross-linkable nitrile rubber composition able to give a cross-linked rubber excellent in both tensile strength at ordinary temperature and tensile strength at a high temperature and a cross-linked rubber obtained using that cross-linkable nitrile rubber composition.

Means for Solving the Problem

The present inventor engaged in in-depth research to solve this problem and as a result discovered that the above object can be achieved by a rubber composition obtained by blending, into a highly saturated nitrile rubber containing α,β-ethylenically unsaturated nitrile monomer units in a ratio of 5 to 50 wt % and having an iodine value of 120 or more, in addition to a cross-linking agent, a staple fiber having an average fiber diameter of 1 µm or less and derived from biomatter in a specific amount and thereby completed the present invention.

That is, according to the present invention, there is provided a cross-linkable nitrile rubber composition comprising a highly saturated nitrile rubber (A) containing α,β-ethylenically unsaturated nitrile monomer units in a ratio of 5 to 50 wt % and having an iodine value of 120 or less, a polysaccharide polymer staple fiber (B) having an average fiber diameter of 1 µm or less, and a cross-linking agent (C), wherein a ratio of content of the polysaccharide polymer staple fiber (B) is 0.5 to 30 parts by weight with respect to 100 parts by weight of the highly saturated nitrile rubber (A).

In the cross-linkable nitrile rubber composition of the present invention, preferably the highly saturated nitrile rubber (A) further comprises carboxyl group-containing monomer units.

In the cross-linkable nitrile rubber composition of the present invention, preferably the polysaccharide polymer staple fiber (B) has an average fiber length of 0.1 to 100 µm.

In the cross-linkable nitrile rubber composition of the present invention, preferably the polysaccharide polymer staple fiber (B) is cellulose fiber.

In the cross-linkable nitrile rubber composition of the present invention, preferably the cross-linking agent (C) is blended into a master batch comprising the highly saturated nitrile rubber (A) and the polysaccharide polymer staple fiber (B).

The cross-linkable nitrile rubber composition of the present invention is preferably one produced by mixing the highly saturated nitrile rubber (A) and the polysaccharide polymer staple fiber (B) in an aqueous system and making a mixture coprecipitate by coagulation by salting out to obtain a master batch comprising the highly saturated nitrile rubber (A) and the polysaccharide polymer staple fiber (B) and mixing the cross-linking agent (C) into the master batch.

In the cross-linkable nitrile rubber composition of the present invention, preferably the highly saturated nitrile rubber (A) contains 50 wt % or less of methylethyl ketone insolubles.

The cross-linkable nitrile rubber composition of the present invention preferably further comprises a basic cross-linking accelerator (D).

Further, according to the present invention, there is provided a cross-linked rubber obtained by cross-linking the cross-linkable nitrile rubber composition according to any one of the above.

Effects of Invention

According to the present invention, it is possible to provide a cross-linkable nitrile rubber composition able to give a cross-linked rubber excellent in both tensile strength at ordinary temperature and tensile strength at a high temperature and a cross-linked rubber obtained using that cross-linkable nitrile rubber composition.

DESCRIPTION OF EMBODIMENTS

Cross-Linkable Nitrile Rubber Composition

The cross-linkable nitrile rubber composition of the present invention contains a highly saturated nitrile rubber (A) containing α,β-ethylenically unsaturated nitrile monomer units in a ratio of 5 to 50 wt % and having an iodine value of 120 or more, a polysaccharide polymer staple fiber (B) having an average fiber diameter of 1 µm or less, and a cross-linking agent (C) and has a ratio of content of the polysaccharide polymer staple fiber (B) of 0.5 to 30 parts by weight with respect to 100 parts by weight of the highly saturated nitrile rubber (A).

Highly Saturated Nitrile Rubber (A)

The highly saturated nitrile rubber (A) used in the present invention is a rubber which contains α,β-ethylenically unsaturated nitrile monomer units in a ratio of 5 to 50 wt % and has an iodine value of 120 or less.

The α,β-ethylenically unsaturated nitrile monomer forming the α,β-ethylenically unsaturated nitrile monomer units contained in the highly saturated nitrile rubber (A) used in the present invention is not particularly limited, but one having 3 to 18 carbon atoms is preferable, while one having 3 to 9 carbon atoms is particularly preferable. As specific examples, acrylonitrile, methacrylonitrile, α-chloroacrylonitrile, etc. may be mentioned. Among these, acrylonitrile is preferable. These α,β-ethylenically unsaturated nitrile monomer may be used as single types alone or may be used as two types or more together.

In the highly saturated nitrile rubber (A), the content of the α,β-ethylenically unsaturated nitrile monomer units is 5 to 50 wt %, preferably 10 to 48 wt %, more preferably 15 to 45 wt %. If the content of the α,β-ethylenically unsaturated nitrile monomer units is too small, the obtained cross-linked rubber is liable to become inferior in oil resistance, while if too large, the cold resistance may fall.

Further, the highly saturated nitrile rubber (A) used in the present invention preferably further contains diene monomer units and/or α-olefin monomer units from the viewpoint of improvement of the mechanical properties by rubber elasticity.

As the diene monomer forming the diene monomer units, conjugated dienes having 4 or more carbon atoms such as 1,3-butadiene, isoprene, 2,3-dimethyl-1,3-butadiene, and 1,3-pentadiene; nonconjugated dienes having 5 to 12 carbon atoms such as 1,4-pentadiene and 1,4-hexadiene may be mentioned. Among these, conjugated dienes are preferable, while 1,3-butadiene is more preferable. The α-olefin monomer forming the α-olefin monomer units is preferably one having 2 to 12 carbon atoms. Ethylene, propylene, 1-butene, 4-methyl-1-pentene, 1-hexene, 1-octene, etc. may be mentioned. These diene monomers and α-olefin monomers may be used as single types alone or may be used as two types or more together.

In the highly saturated nitrile rubber (A), the content of the diene monomer units and/or α-olefin monomer units is preferably 30 to 95 wt %, more preferably 35 to 85 wt %, still more preferably 40 to 75 wt %. By making the content of the diene monomer units and/or α-olefin monomer units the above range, the obtained cross-linked rubber can be made excellent in rubber elasticity while maintaining well the heat resistance and chemical stability.

Further, the highly saturated nitrile rubber (A) used in the present invention is preferably one containing carboxyl group-containing monomer units in addition to α,β-ethylenically unsaturated nitrile monomer units and diene monomer units and/or α-olefin monomer units from the viewpoint of the effect of the present invention becoming much more remarkable. The carboxyl group-containing monomer units can be made to act as cross-linkable monomer units in the highly saturated nitrile rubber (A).

As the carboxyl group-containing monomer foaming the carboxyl group-containing monomer units, for example, an α,β-ethylenically unsaturated monocarboxylic acid monomer, α,β-ethylenically unsaturated polyvalent carboxylic acid monomer, and α,β-ethylenically unsaturated dicarboxylic acid monoester monomer, etc. may be mentioned. Further, a carboxyl group-containing monomer also includes a monomer whose carboxyl group foam a carboxylic acid salt. Furthermore, anhydrides of α,β-ethylenically unsaturated polyvalent carboxylic acid also can form carboxyl groups by cleavage of acid anhydride group after copolymerization, so can be used as a carboxyl group-containing monomer.

As the α,β-ethylenically unsaturated monocarboxylic acid monomer, acrylic acid, methacrylic acid, ethylacrylic acid, crotonic acid, silicic acid, etc. may be mentioned.

As the α,β-ethylenically unsaturated polyvalent carboxylic acid monomer, butenedioic acids such as fumaric acid and maleic acid, itaconic acid, citraconic acid, mesaconic acid, glutaconic acid, allylmalonic acid, teraconic acid, etc. may be mentioned. Further, as anhydrides of α,β-unsaturated polyvalent carboxylic acid, maleic anhydride, itaconic anhydride, citraconic anhydride, etc. may be mentioned.

As the α,β-ethylenically unsaturated dicarboxylic acid monoester monomers, maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethylcyclopentyl maleate and monoethylcyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethylcyclopentyl itaconate and monoethylcyclohexyl itaconate, etc. may be mentioned.

The carboxyl group-containing monomer may be used as single types alone or as a plurality of types combined. Among these as well, an α,β-ethylenically unsaturated dicarboxylic acid monoester monomer is preferable, a maleic acid monoalkyl ester is more preferable, and mono-n-butyl maleate is particularly preferable.

In the highly saturated nitrile rubber (A), the content of the carboxyl group-containing monomer units is preferably 0.5 to 30 wt %, more preferably 1 to 25wt %, still more preferably 2 to 20wt %. By making the content of the carboxyl group-containing monomer units the above range, the compression set resistance of the obtained cross-linked rubber can be suitably improved.

Further, the highly saturated nitrile rubber (A) used in the present invention may be one containing, in addition to α,β-ethylenically unsaturated nitrile monomer units, diene monomer units and/or α-olefin monomer units, and carboxyl group-containing monomer units contained in accordance with need, units of another monomer copolymerizable with these monomers. As such another monomer, a nonconjugated diene monomer, aromatic vinyl monomer, α,β-ethylenically unsaturated monocarboxylic acid ester, polyvalent ester of α,β-ethylenically unsaturated polyvalent carboxylic acid (except ones corresponding to the above-mentioned carboxyl group-containing monomers), cross-linkable monomer, copolymerizable antiaging agent, etc. may be mentioned.

As the nonconjugated diene monomer, one having 5 to 12 carbon atoms is preferable. For example, 1,4-pentadiene, 1,4-hexadiene, vinylnorbornene, dicyclopentadiene, etc. may be mentioned.

As the aromatic vinyl monomer, for example, styrene, α-methylstyrene, vinylpyridine, etc. may be mentioned.

As the α,β-ethylenically unsaturated monocarboxylic acid ester, for example, ethyl(meth)acrylate (meaning ethyl acrylate and ethyl methacrylate, same below), butyl(meth)acrylate, 2-ethylhexyl(meth)acrylate, 2-methoxyethyl(meth)acrylate, etc. may be mentioned.

As the polyvalent ester of α,β-ethylenically unsaturated polyvalent carboxylic acid, for example, dimethyl maleate, di-n-butyl maleate, dimethyl fumarate, di-n-butyl fumarate, dimethyl itaconate, di-n-butyl itaconate, etc. may be mentioned.

As the cross-linkable monomer, for example, divinyl compounds such as divinylbenzene; di(meth)acrylic acid esters such as ethylene di(meth)acrylate, diethyleneglycol di(meth)acrylate, and ethyleneglycol di(meth)acrylate; trimethacrylic acid esters such as trimethylolpropane tri(meth)acrylate; and other polyfunctional ethylenically unsaturated monomers and also self-cross-linkable monomers such as N-methylol(meth)acrylamide and N,N'-dimethylol(meth)acrylamide etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be used as a plurality of types together. In the highly saturated nitrile rubber (A), the content of the units of the other monomers is preferably 50 wt % or less, more preferably 45 wt % or less, still more preferably 40 wt % or less.

The highly saturated nitrile rubber (A) used in the present invention has an iodine value of 120 or less, preferably 80 or less, more preferably 25 or less, still more preferably 15 or less. If the highly saturated nitrile rubber (A) is too high in iodine value, the cross-linked rubber is liable to fall in heat resistance and ozone resistance.

Further, the highly saturated nitrile rubber (A) used in the present invention contains methylethyl ketone insolubles in preferably 50 wt % or less, more preferably 30 wt % or less, still more preferably 10 wt % or less. By making the methylethyl ketone insolubles the above range, it is possible to make the cross-linkable nitrile rubber composition better in processability and possible to make the obtained cross-linked rubber better in mechanical strength. The lower limit of the methylethyl ketone insolubles is not particularly limited, but is usually 0.001 wt % or more.

Further, in the present invention, the methylethyl ketone insolubles can be measured by precisely weighing 300 mg of the highly saturated nitrile rubber (A), placing it in a cage made of 100 mesh stainless steel wire net, immersing the cage in 100 ml of methylethyl ketone and allowing it to stand at 25° C. for 48 hours, then lifting up the cage from the methylethyl ketone, evaporating and drying the content to a solid, and precisely weighing the insolubles remaining in the cage.

Further, the methylethyl ketone insolubles of the highly saturated nitrile rubber (A) can be controlled by suitably selecting various factors at the time of polymerization of the nitrile copolymer rubber (A) such as the polymerization temperature, reaction time, polymerization addition rate, type or amount of use of the polymerization initiator, type and amount of use of the chain transfer agent, and method of addition of the same, the type and amount of use of the carboxyl group-containing monomer, the type and amount of use of the other monomer, and the hydrogenation conditions and adjusting the degree of branching and degree of cross-linking of the highly saturated nitrile rubber (A). For example, at the time of polymerization of the nitrile copolymer rubber (A), the lower the polymerization temperature is made, the lower the content of the methylethyl ketone insolubles can be made. Further, the smaller the amount of use of the chain transfer agent, the higher the content of the methylethyl ketone insolubles can be made.

The polymer Mooney viscosity ($ML_{1+4}$, 100° C.) of the highly saturated nitrile rubber (A) is preferably 5 to 200, more preferably 15 to 150, still more preferably 30 to 100. If the polymer Mooney viscosity of the highly saturated nitrile rubber (A) is too low, the obtained cross-linked rubber is liable to fall in mechanical properties, while conversely, if too high, the cross-linkable nitrile rubber composition may fall in processability.

The method of production of the highly saturated nitrile rubber (A) used in the present invention is not particularly limited. For example, the method of copolymerizing an α,β-ethylenically unsaturated nitrile monomer, diene monomer and/or α-olefin monomer, and a carboxyl group-containing monomer and copolymerizable other monomer added in accordance with need is convenient and preferable. As the polymerization method, any one of the known emulsion polymerization method, suspension polymerization method, bulk polymerization method, and solution polymerization method may be used, but since control of the polymerization reaction is easy, the emulsion polymerization method is preferable. Note that, if the iodine vaue of the copolymer obtained by copolymerization is higher than 120, it is preferable to hydrogenate the copolymer (hydrogenation reaction). In this case, the method of hydrogenation is not particularly limited, but a known method may be employed.

Polysaccharide Polymer Staple Fiber (B)

The polysaccharide polymer staple fiber (B) used in the present invention is a staple fiber of a polysaccharide polymer having an average fiber diameter of 1 μm or less. By using the above-mentioned highly saturated nitrile rubber (A) and polysaccharide polymer staple fiber (B) combined, the obtained cross-linked rubber can be made excellent in both tensile strength at ordinary temperature and tensile strength at a high temperature.

The polysaccharide polymer staple fiber (B) used in the present invention needs only be one falling under the category of a polymer compound in polysaccharides, but for example cellulose fiber (pulp) derived from wood, bamboo, hemp, jute, kenaf, straw, rice husks, recycled paper, or agricultural residue and waste, chitin fiber and chitosan fiber derived from shells etc., and other fibers derived from various types of biomatter may be mentioned. Among these as well, cellulose fiber is preferable.

Further, the polysaccharide polymer staple fiber (B) needs only be a fibrous one, but it is preferably fibrillated by mechanical shear force. The method of fibrillation by mechanical shear force is not particularly limited, but for example the method of dispersing a polysaccharide polymer fiber as the starting material in water, then beating it or passing it through an orifice etc. to apply mechanical shear etc. may be mentioned. More specifically, the method of using a high pressure homogenizer, ball mill, grinder, high pressure injection by ultrasonic waves or water jets etc. may be used.

The average fiber diameter of the polysaccharide polymer staple fiber (B) is 1 µm or less, preferably 0.5 µm or less, more preferably 0.1 µm or less. Further, the lower limit of the average fiber diameter is not particularly limited, but is normally 0.001 µm or more. The average fiber diameter is the average value of the diameters of fibers of the polysaccharide polymer staple fiber (B) and can be found by using image analysis of a scan type electron micrograph, transmission type electron micrograph, or scan type probe micrograph to measure the diameters of 100 randomly selected staple fibers and obtaining the arithmetic average of the same. If the average fiber diameter of the polysaccharide polymer staple fiber (B) is too large, the obtained cross-linked rubber ends up deteriorating in tensile strength at a high temperature.

The average fiber length of the polysaccharide polymer staple fiber (B) is not particularly limited, but is preferably 0.1 to 100 µm, more preferably 1 to 10 µm. By the average fiber length being in the above range, it is possible to better enhance the effect of improvement of the tensile strength at a high temperature of the obtained cross-linked rubber. The average fiber length of the polysaccharide polymer staple fiber (B) can, for example, be found by using image analysis of a scan type electron micrograph to measure the lengths of 100 randomly selected staple fibers and obtaining the arithmetic average of the same.

Further, the specific surface area of the polysaccharide polymer staple fiber (B) is preferably 10 to 1000 $m^2/g$, more preferably 50 to 500 $m^2/g$. By the specific surface area being in the above range, it is possible to better enhance the effect of improvement of the tensile strength at a high temperature of the obtained cross-linked rubber.

The polymerization degree of the polysaccharide polymer forming the polysaccharide polymer staple fiber (B) used in the present invention is not particularly limited, but is preferably 50 to 10000, more preferably 100 to 5000. By using, as the polysaccharide polymer forming the polysaccharide polymer staple fiber (B), one having a polymerization degree in the above range, it is possible to better raise the effect of improvement of the tensile strength at a high temperature of the obtained cross-linked rubber.

Further, the polysaccharide polymer forming the polysaccharide polymer staple fiber (B) used in the present invention may be chemically modified. As the chemical modification, acylation such as acetylation, cyanoethylation, amination, sulfone esterification, phosphoric acid esterification, alkylation such as butylation, chlorination, oxidation, alkylcarbamation, arylcarbamation and various other chemical modification may be mentioned.

In the cross-linkable nitrile rubber composition of the present invention, the content of the polysaccharide polymer staple fiber (B) is 0.5 to 30 parts by weight with respect to 100 parts by weight of the highly saturated nitrile rubber (A), preferably 1 to 20 parts by weight, more preferably 5 to 15 parts by weight. If the content of the polysaccharide polymer staple fiber (B) is too small, the tensile strength at a high temperature becomes insufficient, while if the content is too large, the fatigue resistance may deteriorate.

Cross-Linking Agent (C)

The cross-linking agent (C) used in the present invention is not particularly limited, but an organic peroxide cross-linking agent, polyamine cross-linking agent, sulfur-based cross-linking agent, etc. may be mentioned.

As the organic peroxide cross-linking agent, a conventionally known one may be used. Dicumyl peroxide, cumen hydroperoxide, t-butylcumyl peroxide, p-menthane hydroperoxide, di-t-butylperoxide, 1,3-bis(t-butylperoxyisopropyl) benzene, 1,4-bis(t-butylperoxyisopropyl)benzene, 1,1-di-t-butylperoxy-3,3-trimethylcyclohexane, 4,4-bis-(t-butylperoxy)-n-butylvalerate, 2,5-dimethyl-2,5-di-t-butylperoxyhexane, 2,5-dimethyl-2,5-di-t-butylperoxyhexine-3,1,1-di-t-butylperoxy-3,5,5-trimethylcyclohexane, p-chlorobenzoyl peroxide, t-butylperoxyisopropyl carbonate, t-butylperoxybenzoate etc. may be mentioned. Among these as well, 1,3-bis(t-butylperoxyisopropyl)benzene is preferable. These may be used as single types alone or as a plurality of types combined.

The polyamine cross-linking agent is not particularly limited sso long as a compound having two or more amino groups or one becoming the form of a compound having two or more amino groups at the time of cross-linking, but a compound of an aliphatic hydrocarbon or aromatic hydrocarbon where its plurality of hydrogen atoms are substituted by amino groups or hydrazide structures (structures represented by $—CONHNH_2$, where CO shows a carbonyl group). As specific examples of the polyamine cross-linking agent, aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylene dianiline, m-phenylene diamine, 4,4-diaminodiphenyl ether, 3,4-diaminodiphenyl ether, 4,4-(m-phenylene diisopropylidene)dianiline, 4,4-(p-phenylene diisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; polyvalent hydrazides such as isophthalic dihydrazide, terephthalic dihydrazide, phthalic dihydrazide, 2,6-naphthalene dicarboxylic acid dihydrazide, naphthalene acid dihydrazide, oxalic dihydrazide, malonic dihydrazide, succinic dihydrazide, glutamic dihydrazide, adipic dihydrazide, pimelic dihydrazide, suberic dihydrazide, azelaic dihydrazide, sebacic dihydrazide, brassylic dihydrazide, dodecane diacid dihydrazide, acetone dicarboxylic acid dihydrazide, fumaric dihydrazide, maleic dihydrazide, itaconic dihydrazide, trimellitic dihydrazide, 1,3,5-benzenetricarboxylic acid dihydrazide, aconitic dihydrazide, and pyromellitic dihydrazide may be mentioned. Among these as well, from the viewpoint of being able to make the effects of the present invention much more remarkable, aliphatic polyvalent amines and aromatic polyvalent amines are preferable, while hexamethylene diamine carbamate and 2,2-bis[4-(4-aminophenoxy) phenyl]propane are particularly preferable. Note that, the above polyamine cross-linking agents maybe used as single types alone or as two types or more combined.

As the sulfur-based cross-linking agent, sulfur such as powdered sulfur and precipitated sulfur; an organosulfur compound such as 4,4'-dithiomoipholin, tetramethyl thiuram disulfide, tetraethyl thiuram disulfide, and polymer polysulfides; etc. may be mentioned.

In the cross-linkable nitrile rubber composition of the present invention, the amount of the cross-linking agent (C) is preferably 0.5 to 20 parts by weight with respect to 100 parts by weight of the highly saturated nitrile rubber (A), more preferably 1 to 15 parts by weight, still more preferably 2 to 10 parts by weight. If the amount of the cross-linking agent (C) is too small, the obtained cross-linked rubber is liable to fall in mechanical properties. On the other hand, if too large, the obtained cross-linked rubber may deteriorate in fatigue resistance.

Basic Cross-Linking Accelerator (D)

Further, the cross-linkable nitrile rubber composition of the present invention preferably further contains, in addition to the above-mentioned highly saturated nitrile rubber (A), polysaccharide polymer staple fiber (B), and cross-linking agent (C), a basic cross-linking accelerator (D). By further including the basic cross-linking accelerator (D), the effect of the present invention becomes much more remarkable.

As specific examples of the basic cross-linking accelerator (D), basic cross-linking accelerators having a cyclic amidine structure such as 1,8-diazabicyclo[5,4,0]undecene-7 (below, sometimes abbreviated as "DBU"), 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; guanidine-based basic cross-linking accelerators such as tetramethylguanidine, tetraethylguanidine, diphenylguanidine, 1,3-di-o-tolylguanidine, and o-tolylbiguanide; aldehyde amine-based basic cross-linking accelerators such as n-butylaldehyde aniline and acetoaldehyde ammonia; dicycloalkylamine such as dicyclopentylamine, dicyclohexylamine, and dicycloheptylamine; secondary amine-based basic cross-linking accelerators such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; etc. may be mentioned. Among these as well, a guanidine-based basic cross-linking accelerator, secondary amine-based basic cross-linking accelerator, and basic cross-linking accelerator having a cyclic amidine structure are preferable, a basic cross-linking accelerator having a cyclic amidine structure is more preferable, 1,8-diazabicyclo[5,4,0]undecene-7 and 1,5-diazabicyclo[4,3,0]nonene-5 are further preferable, and 1,8-diazabicyclo[5,4,0]undecene-7 is particularly preferable. Note that, the basic cross-linking accelerator having a cyclic amidine structure may form a salt with an organic carboxylic acid, alkyl phosphoric acid, etc. Further, the secondary amine-based basic cross-linking accelerator may be one mixed with an alkyleneglycol or alcohols such as an alkylalcohol having 5 to 20 carbon atoms and may be one further containing inorganic acids and/or organic acids. Further, it is also possible for the secondary amine-based basic cross-linking accelerator and the inorganic acid and/or organic acid to form a salt and further form a composite with the alkyleneglycol.

When blending in a basic cross-linking accelerator (D), the amount in the cross-linkable nitrile rubber composition of the present invention is preferably 0.1 to 20 parts by weight with respect to 100 parts by weight of the highly saturated nitrile rubber (A), more preferably 0.2 to 15 parts by weight, still more preferably 0.5 to 10 parts by weight. By making the amount of the basic cross-linking accelerator (D) the above range, it is possible to make the cross-linkable nitrile rubber composition better in cross-linkability and possible to make the effect of the present invention much higher.

Other Ingredients

Further, the cross-linkable nitrile rubber composition of the present invention may have blended into it, in addition to the above, other compounding agents which are usually used in the field of rubber processing, for example, a reinforcing agent such as carbon black and silica, a filler such as calcium carbonate, talc, and clay, metal oxide such as zinc oxide and magnesium oxide, co-cross-linking agent, cross-linking aid, cross-linking retarder, antiaging agent, antioxidant, photostabilizer, scorch preventer such as a primary amine, activator such as diethyleneglycol, silane coupling agent, plasticizer, processing aid, slip agent, tackifier, lubricant, flame retardant, antifungal agent, acid acceptor, antistatic agent, pigment, foaming agent, etc. The amounts of these compounding agents are not particularly limited so long as in ranges not impairing the object or effects of the present invention. As the amounts of these compounding agents, amounts according to the purposes of inclusion may be suitably employed.

As the carbon black, for example, furnace black, acetylene black, thermal black, channel black, austin black, graphite, etc. may be mentioned. These may be used as single types or as a plurality of types combined.

As the silica, natural silica such as quartz powder and silicastone powder; synthetic silica such as anhydrous silicic acid (silica gel, aerosil, etc.) and hydrous silicic acid; etc. may be mentioned. Among these as well, synthetic silica is preferable. Further, these silicas may be surface treated by a silane coupling agent etc.

The silane coupling agent is not particularly limited, but as specific examples, silane coupling agents containing sulfur such as γ-mercaptopropyl trimethoxysilane, γ-mercaptomethyl trimethoxysilane, γ-mercaptomethyl triethoxysilane, γ-mercaptohexamethyl disilazane, bis(3-triethoxysilylpropyl)tetrasulfane, and bis(3-triethoxysilylpropyl) disulfane; epoxy group-containing silane coupling agents such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatepropyltriethoxysilane; styryl group-containing silane coupling agents such as p-styryltrimethoxysilane; ureide group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyltrimethoxysilane and cyclohexylmethyldimethoxysilane; aluminum-based coupling agents such as acetoalkoxyaluminum diisopropylate; a titanate-based coupling agent such as isopropyltriisostearoyl titanate, isopropyltris(dioctylpyrophosphate) titanate, isopropyltri(N-aminoethyl-aminoethyl)titanate, tetraoctylbis(ditridecylphosphite)titanate, tetra(2,2-diallyloxymethyl-1-butyl)bis(ditridecyl)phosphite titanate, bis(dioctylpyrophosphate) oxyacetate titanate, bis(dioctylpyrophosphate)ethylene titanate, tetraisopropylbis(dioctylphosphite)titanate, and isopropyltriisostearoyl titanate; etc. may be mentioned. These may be used as single types or as a plurality of types combined.

The co-cross-linking agent is not particularly limited, but a low molecular weight or high molecular weight compound having several radical reactive unsaturated groups in its molecule is preferable, for example, polyfunctional vinyl compounds such as divinylbenzene and divinylnaphthalene; isocyanurates such as triallyl isocyanurate and trimethallyl isocyanurate; cyanurates such as triallyl cyanurate; maleimides such as N,N'-m-phenylene dimaleimide; allyl esters of polyvalent acid such as diallyl phthalate, diallyl isophthalate, diallyl maleate, diallyl fumarate, diallyl sebacate, and triallyl phosphate; diethyleneglycolbisallyl carbonate; allyl ethers such as ethyleneglycol diallyl ether, trimethylolpropane triallyl ether, and partial allyl ether of pentaerythrit; allyl-modified resins such as allylated novolac resin and allylated resol resin; tri- to pentafunctional methacrylate compounds or acrylate compounds such as trimethylolpropane trimethacrylate and trimethylolpropane triacrylate; etc. may be mentioned. These may be used as single types or as a plurality of types combined.

The plasticizer is not particularly limited, but a trimellitic acid-based plasticizer, pyromellitic acid-based plasticizer, ether ester-based plasticizer, polyester-based plasticizer, phthalic acid-based plasticizer, adipic acid ester-based plasticizer, phosphoric acid ester-based plasticizer, sebacic-acid ester-based plasticizer, alkylsulfonic acid ester compound plasticizer, epoxylated plant oil-based plasticizer, etc. may be used. As specific examples, tri-2-ethylhexyl trimellitate, trimellitic acid isononyl ester, trimellitic acid mixed linear alkyl ester, dipentaerythritol ester, pyromellitic acid 2-ethylhexyl ester, polyether esters (molecular weight 300 to 5000 or so), bis[2-(2-butoxyethoxy)ethyl]adipate, dioctyl adipate, adipic acid-based polyester (molecular weight 300 to 5000 or so), dioctyl phthalate, disononyl phthalate, dibutyl phthalate, tricresyl phosphate, dibutyl sebacate, alkylsulfonic acid phenyl ester, epoxylated soybean oil, etc. may be mentioned. These may be used as single types or as a plurality of types combined.

Furthermore, the cross-linkable nitrile rubber composition of the present invention may contain another polymer besides the above-mentioned highly saturated nitrile rubber (A) in a range where the effects of the present invention are not obstructed. As the other polymer, an acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber and polyisoprene rubber etc. may be mentioned. In the case of mixing in the other polymer, the amount in the cross-linkable nitrile rubber composition is preferably 30 parts by weight or less with respect to 100 parts by weight or less of the highly saturated nitrile rubber (A), more preferably 20 parts by weight or less, still more preferably 10 parts by weight or less.

Preparation of Cross-Linkable Nitrile Rubber Composition

The cross-linkable nitrile rubber composition of the present invention can be prepared by mixing the above ingredients, but from the viewpoint of further improving the dispersability of polysaccharide polymer staple fiber (B) in the cross-linkable nitrile rubber composition and thereby further improving the effect of blending in the polysaccharide polymer staple fiber (B), it is preferable to prepare it by the following method.

That is, it is preferable to obtain in advance a master batch containing the highly saturated nitrile rubber (A) and the polysaccharide polymer staple fiber (B) and mix the above ingredients with the obtained master batch in a nonaqueous system to prepare the composition. More specifically, the highly saturated nitrile rubber (A) and the polysaccharide polymer staple fiber (B) are mixed in an aqueous system, an aqueous dispersion (aqueous suspension) containing the highly saturated nitrile rubber (A) and polysaccharide polymer staple fiber (B) is prepared, then the aqueous dispersion (aqueous suspension) is salted out to cause the highly saturated nitrile rubber (A) to coagulate and thereby cause the highly saturated nitrile rubber (A) and the polysaccharide polymer staple fiber (B) to coprecipitate to obtain a master batch containing the highly saturated nitrile rubber (A) and polysaccharide polymer staple fiber (B). Further, it is preferable to mix the above ingredients with the obtained master batch containing the highly saturated nitrile rubber (A) and polysaccharide polymer staple fiber (B) in a nonaqueous system to prepare the composition.

The method of mixing the highly saturated nitrile rubber (A) and the polysaccharide polymer staple fiber (B) by an aqueous system is not particularly limited, but the method of mixing a latex of the highly saturated nitrile rubber (A) and an aqueous dispersion (aqueous suspension) of the polysaccharide polymer staple fiber (B) (latex blending) is preferable. Note that, at that time, as the latex of the highly saturated nitrile rubber (A), one having a solid content concentration of preferably 5 to 70 wt %, more preferably 10 to 50 wt %, can be used. In the case of producing the highly saturated nitrile rubber (A) by, for example, emulsion polymerization and in the case of performing a hydrogenation reaction in the state of a latex according to need, the obtained latex of the highly saturated nitrile rubber (A) can be used as is. Further, condensation or dilution may be used to adjust the solid content concentration.

Further, the latex of the highly saturated nitrile rubber (A) can be obtained by dissolving the highly saturated nitrile rubber (A) in an organic solvent, then bringing it into contact with an aqueous phase containing a surfactant etc. and stirring to emulsify it and remove the organic solvent. In this method as well, the obtained latex may be condensed or diluted to adjust the solid content concentration.

The volume average particle size of the highly saturated nitrile rubber (A) used is preferably 0.01 µm to 5 µm, particularly preferably 0.05 µm to 0.5 µm.

Further, as the dispersion medium of the polysaccharide polymer staple fiber (B), it is possible to use one having a solid content concentration of preferably 0.5 to 50 wt %, more preferably 1 to 25 wt. The aqueous dispersion of polysaccharide polymer staple fiber (B) may be one containing small amounts of various types of compounding agents such as a stabilizer and containing impurities.

Further, the latex of the highly saturated nitrile rubber (A) and the aqueous dispersion of the polysaccharide polymer staple fiber (B) can be mixed, for example, by a known mixing method using a propeller type stirring device, homogenizer, rotary stirring device, and electromagnetic stirring device etc.

Further, the aqueous dispersion (aqueous suspension) containing the highly saturated nitrile rubber (A) and the polysaccharide polymer staple fiber (B) is salted out using a coagulant to cause the highly saturated nitrile rubber (A) to coagulate and, due to the coagulation of the highly saturated nitrile rubber (A), to make the highly saturated nitrile rubber (A) and the polysaccharide polymer staple fiber (B) coprecipitate, then if necessary the result is filtered, rinsed by water, and dried to obtain a master batch containing the highly saturated nitrile rubber (A) and the polysaccharide polymer staple fiber (B). The coagulant is not particularly limited, but potassium chloride, sodium chloride, calcium hydroxide, aluminum sulfate, aluminum hydroxide, etc. may be mentioned. Further, the amount of use of the coagulant is preferably 5 to 200 parts by weight with respect to 100 parts by weight of the highly saturated nitrile rubber (A), more preferably 10 to 150 parts by weight. Note that, the coagulant is usually used in the state of an aqueous solution.

Further, it is possible to knead, with the thus obtained aqueous solution containing the highly saturated nitrile rubber (A) and polysaccharide polymer staple fiber (B), the ingredients other than the cross-linking agent (C) and an ingredient which is unstable against heat such as cross-linking aid by a mixing machine such as a Bambury mixer, internal mixer, or kneader for primary kneading, then transfer the mixture to rolls etc. and add the cross-linking agent (C) and the ingredient which is unstable against heat such as cross-linking aid for secondary kneading. Note that, the primary kneading is usually performed at 10 to 200° C., preferably 30 to 180° C. in temperature, for 1 minute to 1 hour, preferably 1 minute to 30 minutes, while the secondary kneading is usually performed at 10 to 100° C., preferably 20 to 60° C. in temperature, for 1 minute to 1 hour, preferably 1 minute to 30 minutes.

Cross-Linked Rubber

The cross-linked rubber of the present invention is obtained by cross-linking the above-mentioned cross-linkable nitrile rubber composition of the present invention.

The cross-linked rubber of the present invention can be produced by forming the cross-linkable nitrile rubber composition of the present invention by, for example, a forming machine corresponding to the shape of the product to be produced, for example, an extruder, injection molding machine, press, rolls, etc., heating it to cause a cross-linking reaction, then fixing the shape as cross-linked rubber. In this case, the composition can be formed in advance, then cross-linked or may be formed and simultaneously cross-linked. The forming temperature is usually 10 to 200° C., preferably 25 to 120° C. The cross-linking temperature is usually 100 to 200° C., preferably is 130 to 190° C., while the cross-linking time is usually 1 minute to 24 hours, preferably 2 minutes to 1 hour, particularly preferably 3 minutes to 6 hours.

Further, the cross-linked rubber sometimes may be cross-linked at its surface, but not sufficiently cross-linked at its inside depending upon its shape, size, etc., so may be further heated for secondary cross-linking.

As the cross-linking method, a general method used for cross-linking rubber such as press cross-linking, steam cross-linking, and oven cross-linking may be suitably selected.

The thus obtained cross-linked rubber of the present invention is obtained using the cross-linkable nitrile rubber composition of the present invention, so is excellent in both tensile strength at ordinary temperature and tensile strength at a high temperature.

Therefore, the cross-linked rubber of the present invention, taking advantage of such a characteristic, can be used for various seal members such as O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, papermaking use rolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field. Among these as well, since the cross-linked rubber of the present invention is particularly excellent in tensile strength at ordinary temperature and tensile strength at a high temperature, it is suitable as a belt, hose, roll, seal, or gasket, in particular is especially suitable as a belt.

EXAMPLES

Below, the present invention will be explained based on more detailed examples, but the present invention is not limited to these examples. Note that, below, "parts", unless otherwise indicated, are based on weight. Further, the tests and evaluations were conducted as follows.

Volume Average Particle Size

The volume average particle size of the latex of the highly saturated nitrile rubber was measured using a laser diffraction scattering method particle size distribution measuring device LS230 (made by Beckman-Coulter).

Iodine Value

The iodine value of the highly saturated nitrile rubber was measured based on JIS K 6235.

Content of Carboxyl Group

The content of carboxyl group of the highly saturated nitrile rubber was measured by the following method. That is, to 0.2 g of 2 mm square pieces of highly saturated nitrile rubber, 100 ml of 2-butanone was added. The mixture was stirred for 16 hours, then 20 ml of ethanol and 10 ml of water were added. While stirring, using a 0.02N hydrous ethanol solution of potassium hydroxide, titration was performed at room temperature using thymol phthalein as an indicator to find the content of carboxyl group of highly saturated nitrile rubber as the number of moles of carboxyl group with respect to 100 g of highly saturated nitrile rubber (units: ephr).

Ratio of Content of Monomer Units Forming Highly Saturated Nitrile Rubber

The ratio of content of the mono-n-butyl maleate units was calculated by adding 100 ml of 2-butanone to 0.2 g of 2 mm square pieces highly saturated nitrile rubber, stirring the mixture for 16 hours, then adding 20 ml of ethanol and 10 ml of water, stirring while using a 0.02N hydrous ethanol solution of potassium hydroxide and thymol phthalein as an indicator for titration at room temperature to find the number of moles of carboxyl group with respect to 100 g of highly saturated nitrile rubber, and converting the found number of moles to the amount of mono-n-butyl maleate units.

The ratios of contents of the 1,3-butadiene units and saturated butadiene units were calculated by using highly saturated nitrile rubber to measure the iodine value before the hydrogenation reaction and after the hydrogenation reaction (according to JIS K 6235).

The ratio of content of acrylonitrile units was calculated in accordance with JIS K6384 by measuring the nitrogen content in the highly saturated nitrile rubber by the Kjeldahl method.

Mooney Viscosity (Polymer Mooney)

The Mooney viscosity (polymer Mooney) of the highly saturated nitrile rubber was measured in accordance with JIS K6300-1 (units: [$ML_{1+4}$, 100° C.]).

Methylethyl Ketone Insolubles 300 mg of the highly saturated nitrile rubber was precisely weighed and placed in a cage made of 100 mesh stainless steel wire net. The cage was immersed in 100 ml of methylethyl ketone (MEK) and allowed to stand at 25° C. for 48 hours. The cage was lifted out from the methylethyl ketone and air dried, then the cage as a whole was vacuum dried at 60° C. for 12 hours, then the insolubles remaining in the cage were precisely weighed and the ratio with respect to the highly saturated nitrile rubber (wt %) was found as the methylethyl ketone insolubles.

Original State Physical Properties (Tensile Strength and Elongation)

The cross-linkable nitrile rubber composition was placed in a vertical 15 cm, horizontal 15 cm, depth 0.2 cm mold and press-formed at 170° C. for 20 minutes while pressing at a press pressure of 10 MPa to obtain sheet-shaped cross-linked rubber. The obtained sheet-shaped cross-linked rubber was punched by a No. 3 type dumbbell shaped cutter to prepare a test piece. Further, the obtained test piece was used to measure tensile strength and elongation of the cross-linked rubber in accordance with JIS K6251.

High Temperature Tensile Test

The same procedure was followed as with evaluation of the original state physical properties to obtain a sheet-shaped cross-linked rubber, then the obtained sheet-shaped cross-linked rubber was punched by a No. 3 dumbbell shaped cutter to prepare a test piece. Further, the obtained test piece was used based on JIS K6251 for a tensile test at 100° C. using a tensile tester equipped with a thermostatic chamber to measure the tensile strength and elongation of the cross-linked rubber at a high temperature environment.

Synthesis Example 1

Synthesis of Latex of Highly Saturated Nitrile Rubber (a-1)

To a reactor, 180 parts of ion exchanged water, 25 parts of a concentration 10 wt % sodium dodecylbenzene sulfonate aqueous solution, 37 parts of acrylonitrile, 6 parts of mono-n-butyl maleate, and 0.5 part of t-dodecyl mercaptan (molecular weight adjuster) were charged in that order, the inside gas was replaced with nitrogen 3 times, then 57 parts of 1,3-butadiene was charged. The reactor was held at 5° C., 0.1 part of cumen hydroperoxide (polymerization initiator) was charged, then the mixture was stirred while continuing the polymerization reaction. Next, when the polymerization addition rate reached 82%, 0.1 part of a concentration 10 wt % hydroquinone aqueous solution (polymerization terminator) was added to stop the polymerization reaction, then a water temperature 60° C. rotary evaporator was used to remove the residual monomers and obtain a latex of nitrile rubber (solid content concentration of about 30 wt %).

Next, the above obtained latex and a palladium catalyst (solution of 1 wt % palladium acetate acetone solution and equal weight of ion exchanged water) was added in an autoclave so that the amount of palladium became 1,000 ppm by weight with respect the dry weight of the rubber contained in the latex. This was reacted by a hydrogenation reaction at a hydrogen pressure of 3 MPa and temperature of 50° C. for 6 hours to obtain a latex (L-1) of highly saturated nitrile rubber (a-1). The volume average particle size of the latex (L-1) was 100 nm.

Further, part of the obtained latex (L-1) was sampled. Dilute sulfuric acid was added to make the pH of latex 4, a large amount of methanol was added to coagulate it, then the solids (crumbs) were taken out and dried in vacuo at 60° C. for 12 hours to obtain a highly saturated nitrile rubber (a-1). The composition of the obtained highly saturated nitrile rubber (a-1) was 35.6 wt % of acrylonitrile units, 59.0 wt % of butadiene units (including saturated parts), and 5.4 wt % of mono-n-butyl maleate units, the iodine value was 8, the content of carboxyl group was $3.1 \times 10^{-2}$ ephr, the polymer Mooney viscosity [$ML_{1+4}$, 100° C.] was 48, and the methylethyl ketone insolubles was 1.1 wt %.

Example 1

To a latex (L-1) of highly saturated nitrile rubber (a-1) obtained in Production Example 1, dilute sulfuric acid was added to adjust the pH of the latex to 4 and adjust the solid content concentration to 18 wt %. To this, an aqueous dispersion of cellulose nanofiber having a solid content concentration of 10 wt % (product name "BiNFi-S", made by Sugino Machine, fiber diameter 0.02 μm, average fiber length of 2 μm, specific surface area 100 to 200 $m^2/g$, polymerization degree 200 to 550, aqueous dispersion of polysaccharide polymer staple fiber (B) comprised of cellulose) was stirred and mixed using a propeller type stirring device so that the highly saturated nitrile rubber (a-1) and cellulose nanofiber became a solid ratio (weight ratio) of "highly saturated nitrile rubber (a-1): cellulose nanofibers" of 100:10 to obtain an aqueous dispersion (latex mixture). Further, the obtained aqueous dispersion was stirred while adding dropwise a coagulating aqueous solution comprising of 10 wt % sodium chloride (amount where amount of sodium chloride becomes 100 parts with respect to 100 parts of highly saturated nitrile rubber) to make solids (crumbs) precipitate. Further, the obtained solids were filtered and rinsed by water, then dried in vacuo at 60° C. for 12 hours to obtain a master batch (MB1) comprising highly saturated nitrile rubber (a-1) and cellulose nanofiber (average fiber diameter 0.02 μm).

Next, using a Bambury mixer, 110 parts of the above obtained master batch (MB1) comprising the highly saturated nitrile rubber (a-1) and cellulose nanofiber, 40 parts of N550 carbon black (product name "Seast SO", made by Tokai Carbon, carbon black), 1.5 parts of 4,4'-di-(α,α-dimethylbenzyl) diphenylamine (product name "Nocrac CD", made by Ouchi Shinko Chemical Industrial, antiaging agent), 5 parts of tri-2-ethylhexyl trimellitate (product name "ADK Cizer C-8", made by Adeka, plasticizer), 1 part of stearic acid, and 1 part of polyoxyethylenealkyl ether phosphoric acid ester (product name "Phosphanol RL210", made by Toho Chemical Industry, processing aid) were kneaded. Next, the obtained kneaded matter was transferred to open rolls and 6.3 parts of 2,2-bis[4-(4-aminophenoxy)phenyl] propane(polyamine cross-linking agent) and 4 parts of 1,8-diazabicyclo[5,4,0]undecene-7 (DBU) (product name "RHENOGRAN XLA-60 (GE2014)", made by Rhein Chemie, DBU60% (including part becoming zinc dialkyldiphosphate salt), basic cross-linking accelerator) were added and kneaded to obtain a cross-linkable nitrile rubber composition.

Further, the obtained cross-linkable nitrile rubber composition was used in accordance with the above-mentioned methods to perform the original state physical properties measurement (tensile strength and elongation) and high temperature tensile test (tensile strength and elongation at high temperature environment).

Example 2

Except for changing the ratio of solid content of highly saturated nitrile rubber (a-1) and cellulose nanofiber (weight ratio) to "highly saturated nitrile rubber (a-1):cellulose nanofibers"=100:15, the same procedure was followed as in Example 1 to obtain a master batch (MB2). Further, except for using 115 parts of the master batch (MB2) obtained above instead of 110 parts of the master batch (MB1) obtained in Example 1, the same procedure was followed as in Example 1 to prepare the cross-linkable nitrile rubber composition and the same procedures were followed to evaluate it.

Example 3

The same procedure was followed as in Example 1 to obtain an aqueous dispersion of the highly saturated nitrile rubber (a-1) and cellulose nanofiber. Further, except for using, as a coagulation solution, a 5 wt % magnesium sulfate aqueous solution in an amount giving an amount of magnesium sulfate of 20 parts with respect to 100 parts of highly saturated nitrile rubber (a-1) instead of a 10 wt % sodium chloride aqueous solution, the same procedure was followed as in Example 1 for coagulation, filtering, and rinsing, then vacuum drying at 60° C. for 12 hours to obtain a master batch (MB3) comprising the highly saturated nitrile rubber (a-1) and cellulose nanofiber.

Further, except for using 110 parts of the above obtained master batch (MB3) instead of 110 parts of the master batch (MB1) obtained in Example 1, the same procedure was followed as in Example 1 to prepare the cross-linkable nitrile rubber composition and the same procedures were followed to evaluate it. The results are shown in Table 1.

Comparative Example 1

The latex (L-1) of the highly saturated nitrile rubber (a-1) was coagulated without adding an aqueous dispersion of cellulose nanofiber to obtain the highly saturated nitrile rubber (a-1). Further, except for using 100 parts of the coagulated highly saturated nitrile rubber (a-1) instead of 110 parts of the master batch (MB1) obtained in Example 1, the same procedure was followed as in Example 1 to prepare the cross-linkable nitrile rubber composition and the same procedures were followed to evaluate it.

Comparative Example 2

Except for using an aqueous dispersion of cellulose fiber (product name "ARBOCEL BE600-10TG", made by Rettenmeier, average fiber diameter of 15 μm and fiber length of 18 μm) of a solid content concentration of 10 wt % instead of an aqueous dispersion of cellulose nanofiber with a solid content concentration of 10 wt % (product name "BiNFi-S", made by Sugino Machine, fiber diameter 0.02 μm, specific surface area 100 to 200 $m^2/g$, polymerization degree 200 to 550, aqueous dispersion of polysaccharide polymer staple fiber (B) comprised of cellulose), the same procedure was followed as in Example 1 to obtain a master batch (MB4) comprised of the highly saturated nitrile rubber (a-1) and cellulose fiber (average fiber diameter: 15 μm).

Further, except for using 110 parts of the master batch (MB4) obtained above instead of 110 parts of the mster batch obtained in Example 1 (MB1), the same procedure was followed as in Example 1 to prepare the cross-linkable nitrile rubber composition and the same procedures were followed to evaluate it. The results are shown in Table 1.

Comparative Example 3

Except for further adding 10 parts of copoly-p-phenylene-3,4'-oxydiphenylene-terephthalamide staple fiber (product name "Technora ZCF T323SB 1 mm", made by Teijin Technoproducts, average fiber diameter of 12 μm, average fiber length of 1 mm) when kneading at the Bambury mixer, the same procedure was followed as in Comparative Example 1 to prepare the cross-linkable nitrile rubber composition and the same procedures were followed to evaluate it. The results are shown in Table 1.

TABLE 1

|  |  | Examples | | | Comparative Examples | | |
| --- | --- | --- | --- | --- | --- | --- | --- |
|  |  | 1 | 2 | 3 | 1 | 2 | 3 |
| Formulation of cross-linkable nitrile rubber composition | | | | | | | |
| Master batch (MB1) (Highly saturated nitrile rubber (a-1):cellulose nanofiber = 100:10, average fiber diameter of cellulose nanofiber: 0.02 μm, coagulated by sodium chloride) | (parts) | 110 | | | | | |
| Master batch (MB2) (Highly saturated nitrile rubber (a-1):cellulose nanofiber = 100:15, average fiber diameter of cellulose nanofiber: 0.02 μm, coagulated by sodium chloride) | (parts) | | 115 | | | | |
| Master batch (MB3) (Highly saturated nitrile rubber (a-1):cellulose nanofiber = 100:10, average fiber diameter of cellulose nanofiber: 0.02 μm, coagulated by magnesium sulfate) | (parts) | | | 110 | | | |
| Master batch (MB4) (Highly saturated nitrile rubber (a-1):cellulose fiber = 100:10, average fiber diameter of cellulose fiber: 15 μm, coagulated by sodium chloride) | (parts) | | | | | 110 | |
| Highly saturated nitrile rubber (a-1) (added alone) | (parts) | | | | 100 | | 100 |
| Copoly-p-phenylene-3,4'-oxydiphenylene-terephthalamide staple fiber | (parts) | | | | | | 10 |
| N550 carbon black | (parts) | 40 | 40 | 40 | 40 | 40 | 40 |
| Tri-2-ethylhexyl trimellitate | (parts) | 5 | 5 | 5 | 5 | 5 | 5 |
| 4,4'-di-(α,α-dimethylbenzyl)diphenylamine | (parts) | 1.5 | 1.5 | 1.5 | 1.5 | 1.5 | 1.5 |
| Stearic acid | (parts) | 1 | 1 | 1 | 1 | 1 | 1 |
| Polyoxyethylenealkyl ether phosphoric acid ester | (parts) | 1 | 1 | 1 | 1 | 1 | 1 |
| 2,2-bis[4-(4-aminophenoxy)phenyl]propane | (parts) | 6.3 | 6.3 | 6.3 | 6.3 | 6.3 | 6.3 |
| 1,8-diazabicyclo[5,4,0]undecene-7 60% product | (parts) | 4 | 4 | 4 | 4 | 4 | 4 |
| Evaluation | | | | | | | |
| Tensile strength (23° C.) (MPa) | | 22.6 | 23.4 | 21.9 | 20.3 | 13.8 | 16 |
| Elongation (23° C.) (%) | | 170 | 160 | 160 | 210 | 60 | 47 |
| Tensile strength (100° C.) (MPa) | | 12.5 | 13.7 | 12.8 | 7.3 | 4.4 | 10.5 |
| Elongation (100° C.) (%) | | 100 | 100 | 90 | 90 | 25 | 15 |

As shown in Table 1, the cross-linked rubber obtained using the cross-linkable nitrile rubber composition comprising the highly saturated nitrile rubber (A) containing α,β-ethylenically unsaturated nitrile monomer units in a ratio of 5 to 50 wt % and having an iodine value of 120 or less, the polysaccharide polymer staple fiber (B) having an average fiber diameter of 1 μm or less, and the cross-linking agent (C), where the ratio of content of the polysaccharide polymer staple fiber (B) was made the predetermined range of the present invention, was excellent in both tensile strength at ordinary temperature and tensile strength at a high temperature (Examples 1 to 3).

On the other hand, when not blending in the polysaccharide polymer staple fiber (B) having an average fiber diameter of 1 μm or less, the obtained cross-linked rubber was inferior in tensile strength at a high temperature (Comparative Example 1).

Further, when using a polysaccharide polymer staple fiber having an average fiber diameter of larger than 1 μm or when using copoly-p-phenylene-3,4'-oxydiphenylene-terephthalamide staple fiber, the obtained cross-linked rubber was inferior in tensile strength at a high temperature (Comparative Examples 2 and 3).

The invention claimed is:

1. A cross-linkable nitrile rubber composition comprising
   a nitrile rubber (A) containing α,β-ethylenically unsaturated nitrile monomer units in a content of 5 to 50 wt % with respect to total monomer units of the nitrile rubber (A) and having an iodine value of 120 or less,
   a polysaccharide polymer staple fiber (B) having an average fiber diameter of 0.1 μm or less and having an average fiber length of 1 to 10 μm, and
   a cross-linking agent (C),
   wherein a content of the polysaccharide polymer staple fiber (B) is 0.5 to 30 parts by weight with respect to 100 parts by weight of the nitrile rubber (A).

2. The cross-linkable nitrile rubber composition according to claim 1, wherein the nitrile rubber (A) further comprises carboxyl group-containing monomer units.

3. The cross-linkable nitrile rubber composition according to claim 1, wherein the polysaccharide polymer staple fiber (B) is cellulose fiber.

4. The cross-linkable nitrile rubber composition according to claim 1, wherein the cross-linking agent (C) is blended into a master batch comprising the nitrile rubber (A) and the polysaccharide polymer staple fiber (B).

5. The cross-linkable nitrile rubber composition according to claim 1, produced by
   mixing the nitrile rubber (A) and the polysaccharide polymer staple fiber (B) in an aqueous system and making a mixture coprecipitate by coagulation by salting out to obtain a master batch comprising the nitrile rubber (A) and the polysaccharide polymer staple fiber (B) and
   mixing the cross-linking agent (C) into the master batch.

6. The cross-linkable nitrile rubber composition according to claim 1, further comprising a basic cross-linking accelerator (D).

7. The cross-linkable nitrile rubber composition according to claim 1, wherein the nitrile rubber (A) contains 50 wt % or less of methylethyl ketone insolubles.

8. A cross-linked rubber obtained by cross-linking the cross-linkable nitrile rubber composition according to claim 1.

* * * * *